(12) United States Patent
Doolittle et al.

(10) Patent No.: US 7,234,750 B1
(45) Date of Patent: Jun. 26, 2007

(54) TAILGATE WITH INTEGRATED AND EXTENSIBLE STEPS FOR A VEHICLE HAVING A CARGO BED

(75) Inventors: William W. Doolittle, Ann Arbor, MI (US); James J. Bartel, Commerce Twp, MI (US); Ronald A. Byrd, Gilbraltar, MI (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/464,957

(22) Filed: Aug. 16, 2006

(51) Int. Cl.
*B62D 33/03* (2006.01)
*B60R 3/02* (2006.01)
(52) U.S. Cl. ...................... 296/62; 296/57.1
(58) Field of Classification Search .............. 296/51, 296/61, 62, 57.1; 280/163, 164.4; 14/69.5, 14/71.1
See application file for complete search history.

(56) References Cited

U.S. PATENT DOCUMENTS

| | | | | |
|---|---|---|---|---|
| 1,181,367 A | * | 5/1916 | Bourgon | 296/62 |
| 2,719,320 A | * | 10/1955 | O'Neill | 16/80 |
| 3,533,654 A | * | 10/1970 | Kannegieter | 280/164.1 |
| 4,639,032 A | | 1/1987 | Barbour | |
| 5,156,432 A | * | 10/1992 | McCleary | 296/61 |
| 5,205,603 A | | 4/1993 | Burdette, Jr. | |
| 5,211,437 A | * | 5/1993 | Gerulf | 296/61 |
| 5,816,638 A | * | 10/1998 | Pool, III | 296/26.11 |
| 5,820,193 A | | 10/1998 | Straffon | |
| 6,454,338 B1 | * | 9/2002 | Glickman et al. | 296/57.1 |
| 6,857,680 B2 | * | 2/2005 | Fielding | 296/62 |
| 6,913,305 B1 | * | 7/2005 | Kern et al. | 296/51 |
| 6,918,624 B2 | * | 7/2005 | Miller et al. | 296/62 |
| 6,942,272 B2 | * | 9/2005 | Livingston | 296/62 |
| 6,964,444 B2 | * | 11/2005 | Chumley et al. | 296/26.08 |
| 7,059,648 B2 | * | 6/2006 | Livingston | 296/62 |

\* cited by examiner

*Primary Examiner*—D. Glenn Dayoan
*Assistant Examiner*—Greg Blankenship
(74) *Attorney, Agent, or Firm*—Jeffrey P. Calfa; Gerald W. Askew; Susan L. Lukasik

(57) ABSTRACT

A tailgate that is hingeably connected to a vehicle and configured to pivot from a closed position to a generally vertical open position includes an inner panel having an inner tailgate surface and an outer panel having an outer tailgate surface. The outer panel is attached to the inner panel to define a pocket therebetween. An opening extends from the inner tailgate surface to the outer tailgate surface and is configured to receive a foot. A step assembly is housed in the pocket and is moveable from a retracted position enclosing the opening, to an extended position revealing the opening. The step assembly includes a stationary frame fixed with respect to the pocket and a moveable frame moveable with respect to the stationary frame. The moveable frame extends from a lower peripheral edge of the tailgate in the extended position.

20 Claims, 8 Drawing Sheets

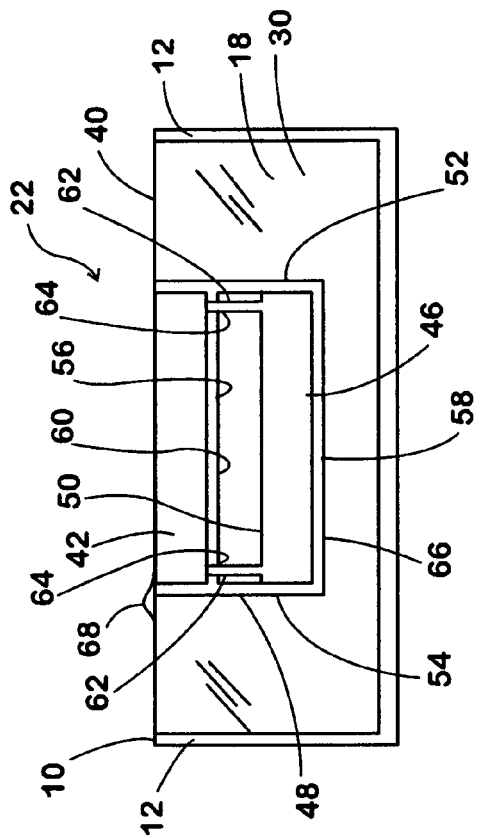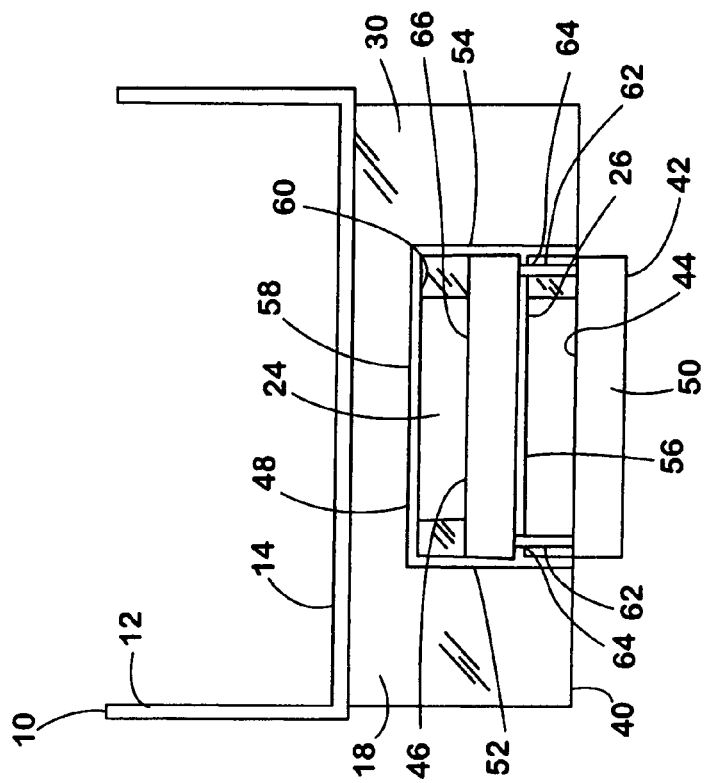

TAILGATE WITH INTEGRATED AND EXTENSIBLE STEPS FOR A VEHICLE HAVING A CARGO BED

BACKGROUND OF THE INVENTION

The present invention relates generally to cargo beds on vehicles. More specifically, the present invention relates to a tailgate on a vehicle cargo bed with extensible steps.

Large automotive vehicles having cargo beds are frequently used to transport cargo from place to place. These types of vehicles can be military vehicles, such as troop transport vehicles, and can also be civilian vehicles, such as sport utility vehicles. Vehicles capable of transporting cargo are made in a variety of shapes and sizes, and can have a variety of tailgate and cargo bed configurations.

Cargo is commonly loaded and unloaded from these large vehicles by the ingress and egress of humans to and from the cargo bed. Since the cargo beds on the larger vehicles are often three feet or more off the ground, the ingress and egress of the human to and from the cargo bed can be difficult. Further, the cargo that is being loaded or unloaded may be heavy or awkwardly shaped, making the ingress and egress even more difficult.

Often, a step stool is placed adjacent the tailgate to assist humans with the ingress and egress of the cargo bed. However, this requires transporting a separate step stool with the cargo. Additionally, since the step stool is not fixed relative to the vehicle, the step stool can move or tip when in use.

Alternatively, a bracket can be installed on the tailgate. Humans entering the cargo bed can first step onto the bracket and then ingress the cargo bed. This configuration is problematic for several reasons. A first problem is that the bracket is generally high off the ground, making it difficult for humans to step onto the bracket from the ground. Another problem is that the bracket protrudes from the interior surface of the tailgate. When the tailgate is closed, the bracket can interfere with cargo, such as by puncturing the cargo. Alternatively, the bracket may take up space in the cargo bed.

Thus, there is a need for a step that provides a comfortable step distance for the ingress into and egress out of the cargo bed.

There is also a need for a step that does not take up space in the cargo bed.

BRIEF SUMMARY OF THE INVENTION

The above-listed needs are met or exceeded by the present tailgate which is hingeably connected to a vehicle and configured to pivot from a closed position to a generally vertical open position. The tailgate includes an inner panel having an inner tailgate surface and an outer panel having an outer tailgate surface. The outer panel is attached to the inner panel to define a pocket therebetween. An opening extends from the inner tailgate surface to the outer tailgate surface and is configured to receive a foot. A step assembly is housed in the pocket and is moveable from a retracted position enclosing the opening, to an extended position revealing the opening. The step assembly includes a stationary frame fixed with respect to the pocket and a moveable frame moveable with respect to the stationary frame. The moveable frame extends from a lower peripheral edge of the tailgate in the extended position.

An alternate embodiment of a tailgate that is hingeably connected to a vehicle and configured to pivot from a closed position to a generally vertical open position is provided. The tailgate includes a pocket defined within the tailgate and extending from a lower peripheral edge generally transverse to the lower peripheral edge. The pocket is oriented between an inner tailgate surface and an outer tailgate surface. An indented bottom surface is located at the lower peripheral edge of the tailgate, and an opening extends from the inner tailgate surface to the outer tailgate surface. The opening extends generally transversely to the pocket. A step assembly is housed in the pocket and is moveable from a retracted position enclosing the indented bottom surface and the opening, to an extended position revealing the indented bottom surface and the opening. The step assembly includes a moveable frame moveable with respect to the pocket. The moveable frame extends from the lower peripheral edge of the tailgate when it is in the extended position.

Another embodiment of a tailgate that is hingeably connected to a vehicle and configured to pivot from a closed position to a generally vertical open position is provided. The tailgate includes an inner panel having an inner tailgate surface and an outer panel having an outer tailgate surface. The outer panel is attached to the inner panel to define a pocket therebetween. An opening extends from the inner tailgate surface to the outer tailgate surface and is configured to receive a foot. An indented surface is located at a lower peripheral edge of the tailgate. A step assembly is housed in the pocket and is moveable from a retracted position enclosing the opening and the indented surface, to an extended position revealing the opening and the indented surface. The step assembly includes a stationary frame fixed with respect to the pocket and a moveable frame moveable with respect to the stationary frame. The moveable frame extends from the lower peripheral edge of the tailgate in the extended position.

BRIEF DESCRIPTION OF THE SEVERAL VIEWS OF THE DRAWINGS

FIG. 4 is a schematic of the step assembly of FIG. 2, with an inner tailgate panel removed to reveal the step assembly extended;

FIG. 5 is a schematic of the step assembly of FIG. 3, with the inner tailgate panel removed to reveal the step assembly retracted;

DETAILED DESCRIPTION OF THE INVENTION

Figure 1:
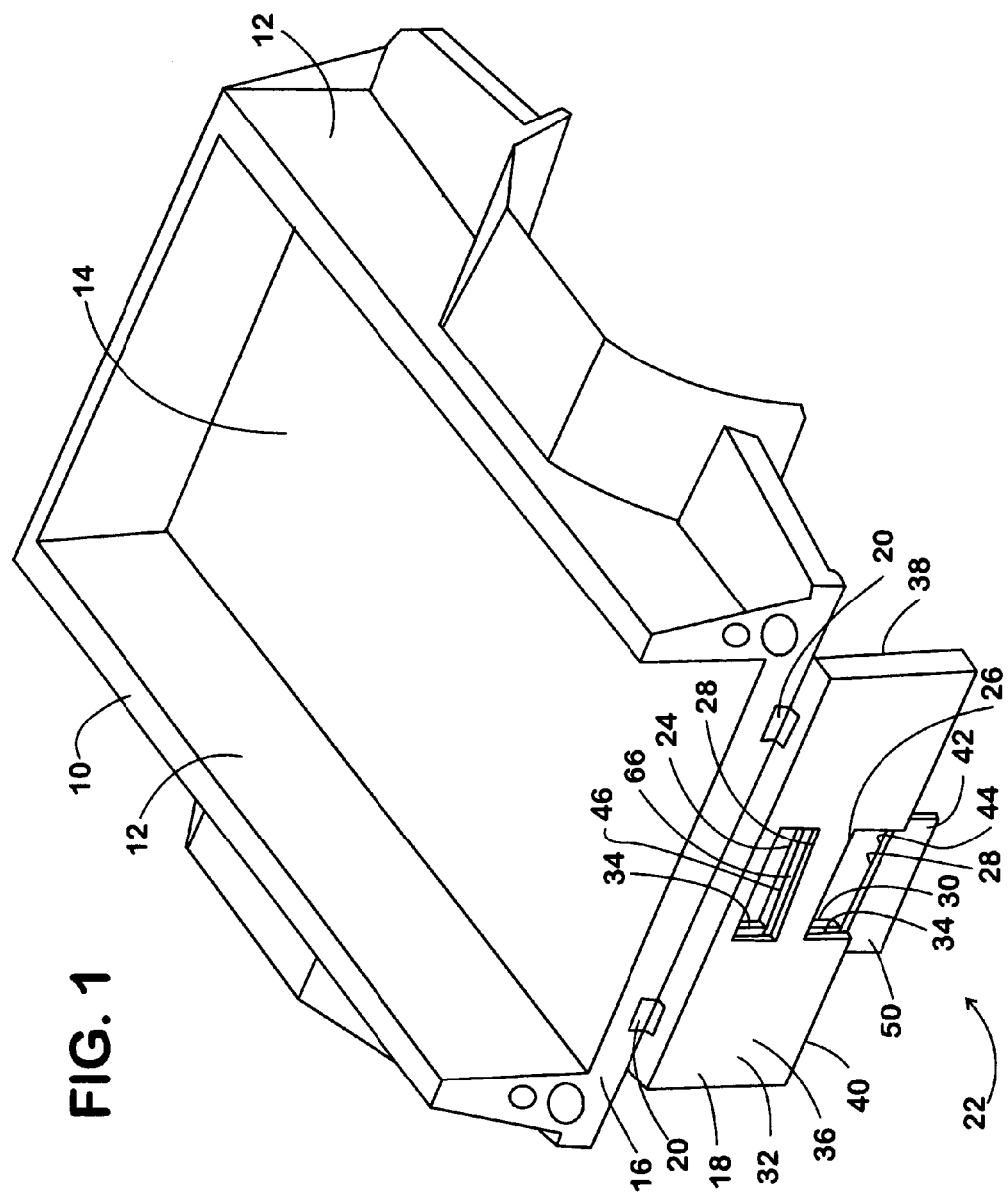
FIG. 1 is rear, perspective view of a cargo bed for a vehicle with a tailgate open and a step assembly extended.

Referring now to FIG. 1, an automotive vehicle (not shown) has a cargo bed 10 mounted to the vehicle in a conventional fashion. The cargo bed 10 is defined by bed sides 12, and a bed surface 14 where cargo is stored. A rear end 16 of the cargo bed 10 is closed off by a tailgate 18, which is shown in the open position. The tailgate 18 is pivotable generally 180-degrees with respect to the vehicle, and in the open position, hangs vertically downward from the cargo bed 10. The tailgate 18 is attached in a conventional way to the cargo body 10 by at least one hinge 20.

A step assembly, indicated generally at 22, is extended generally vertically downward towards the ground from the tailgate 18 in FIG. 1. The step assembly 22, preferably in cooperation with an opening 24 and an indented surface 26 in the tailgate 18, forms at least one and preferably two steps 28 in the tailgate for the ingress and egress of the cargo bed 10. Further, the arrangement of the opening 24 and the indented surface 26 can be varied on the tailgate 18.

The tailgate 18 includes two panels, an outer panel 30 and an inner panel 32, attached to each other to define a pocket 34 therebetween. In the closed position, the inner panel 32 inwardly faces the cargo bed 10 with an inner tailgate surface 36, and the outer panel 30 opposes the cargo bed with an outer tailgate surface 38. The pocket 34 is between the inner panel 32 and the outer panel 30 and houses the step assembly 22. The step assembly 22 is configured to slidingly reciprocate between an extended and a retracted position in the pocket 34. The step assembly 22 does not protrude from the inner and outer tailgate surfaces 36, 38 because the outer panel 30 and the inner panel 32 surround and confine the step assembly in the depth direction of the tailgate 18.

Figure 2:
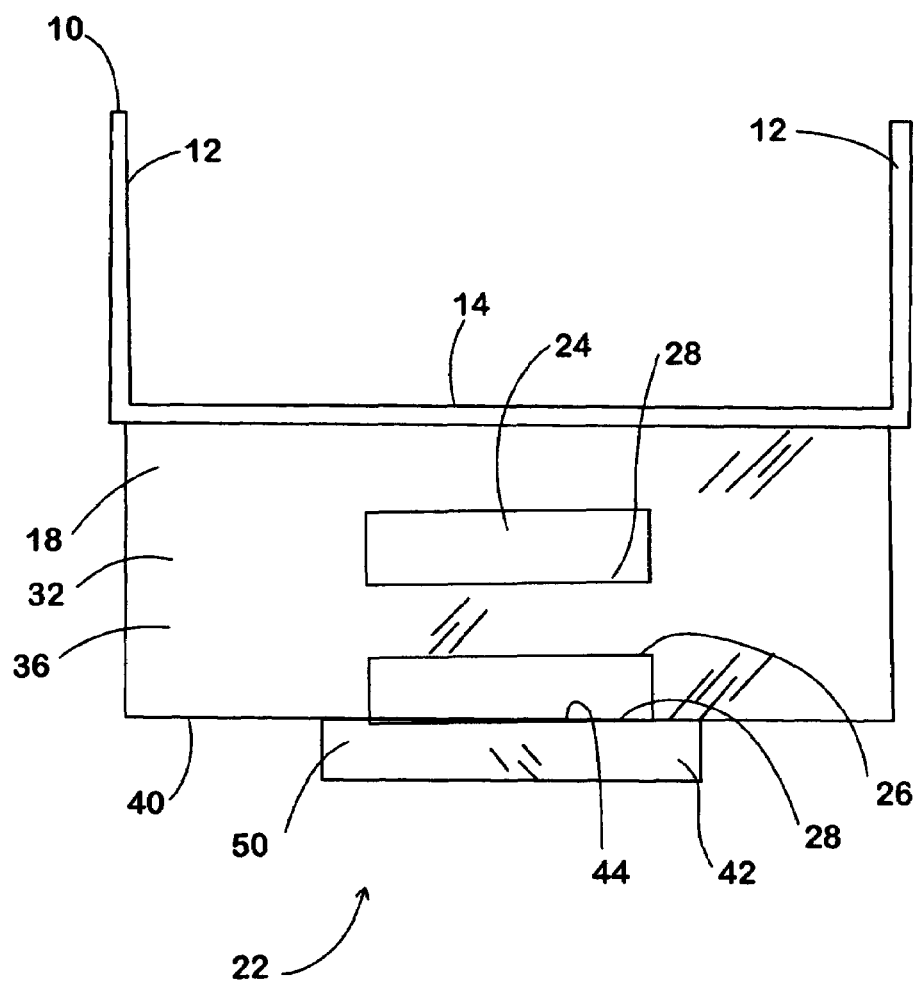
FIG. 2 is a schematic of the tailgate open and the step assembly of FIG. 1 extended.

Referring now to FIGS. 1 and 2, the tailgate 18 is in the fully open position, generally 180-degrees from the fully closed position, and the step assembly 22 is extended. Preferably, the opening 24 and the indented surface 26 are formed in each of the outer and inner panels 30, 32, such that the respective openings and surfaces are aligned with each other. In this manner, the opening 24 extends through the tailgate 18 from the inner tailgate surface 36 to the outer tailgate surface 38.

In the preferred embodiment, the indented surface 26 is located at a lower peripheral edge 40 of the tailgate 18 and is of sufficient size and shape to accommodate a foot. It is contemplated that the indented surface 26 may alternatively be an opening located above the lower peripheral edge 40. The opening 24 is preferably located above the indented surface 26, and is generally located centrally in the tailgate 18. Similar to the indented surface 26, the opening 24 is formed with a sufficient size and shape to accommodate a foot.

In the preferred embodiment, a drop-down step 42 extends downwardly beyond the lower peripheral edge 40 of the tailgate 18. A top surface of the drop-down step 42 provides a stepping surface 44 for ingress and egress. Preferably, the drop-down step 42 is at least as long as the length of the indented surface 26 such that the stepping surface 44 spans the entire length of the opening formed between the indented surface and the stepping surface.

Figure 3:
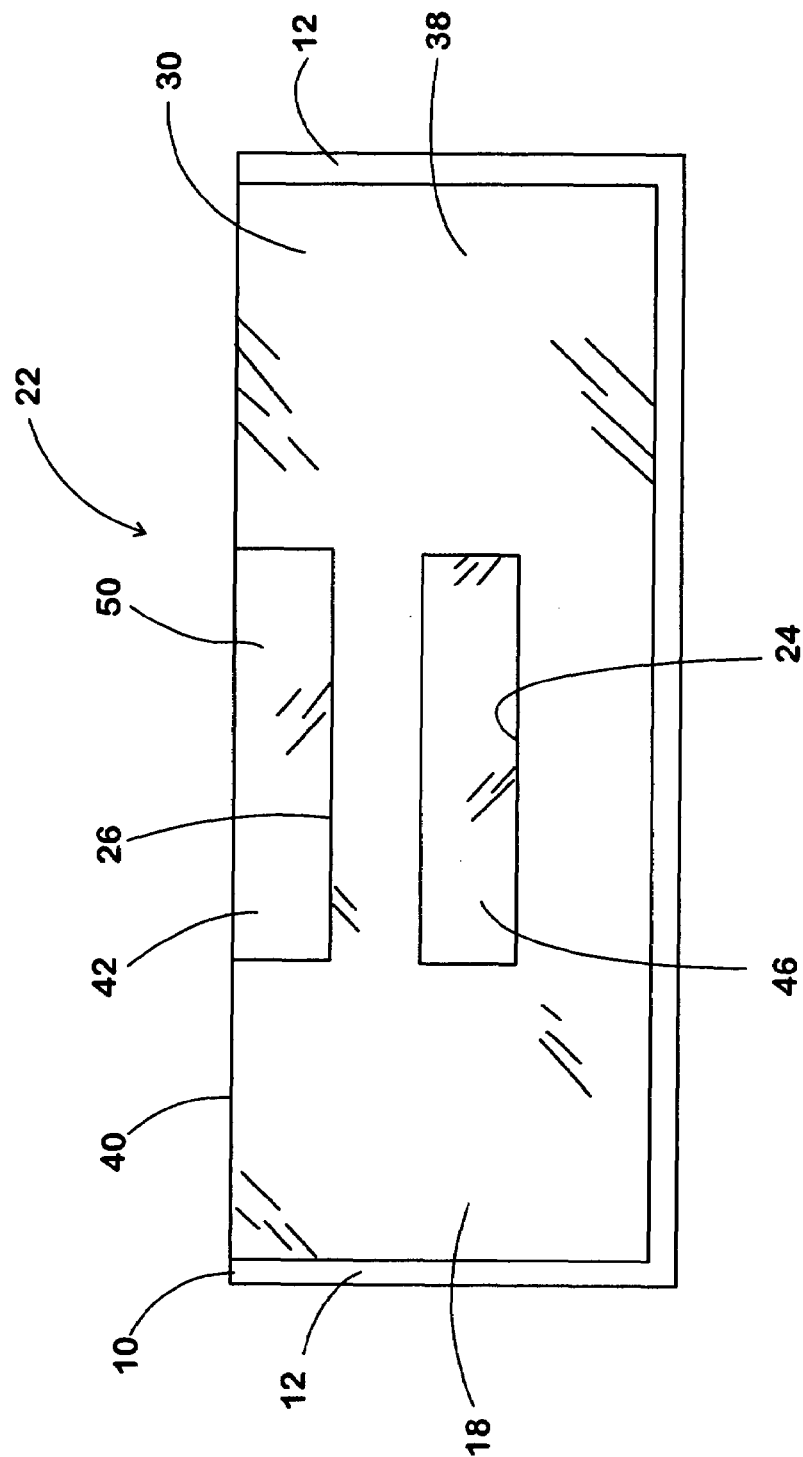
FIG. 3 is a schematic of the tailgate closed and the step assembly of FIG. 1 retracted.
Figure 6:
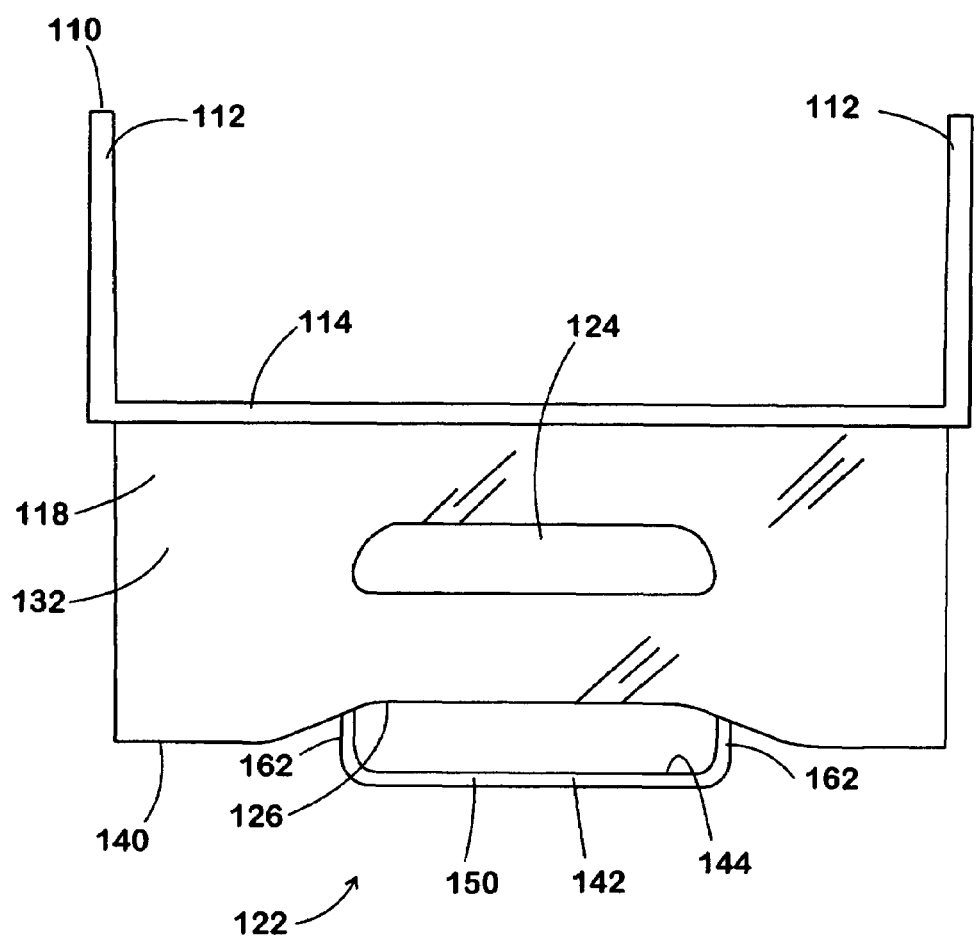
FIG. 6 is a schematic of an alternate embodiment of a step assembly extended.
Figure 7:
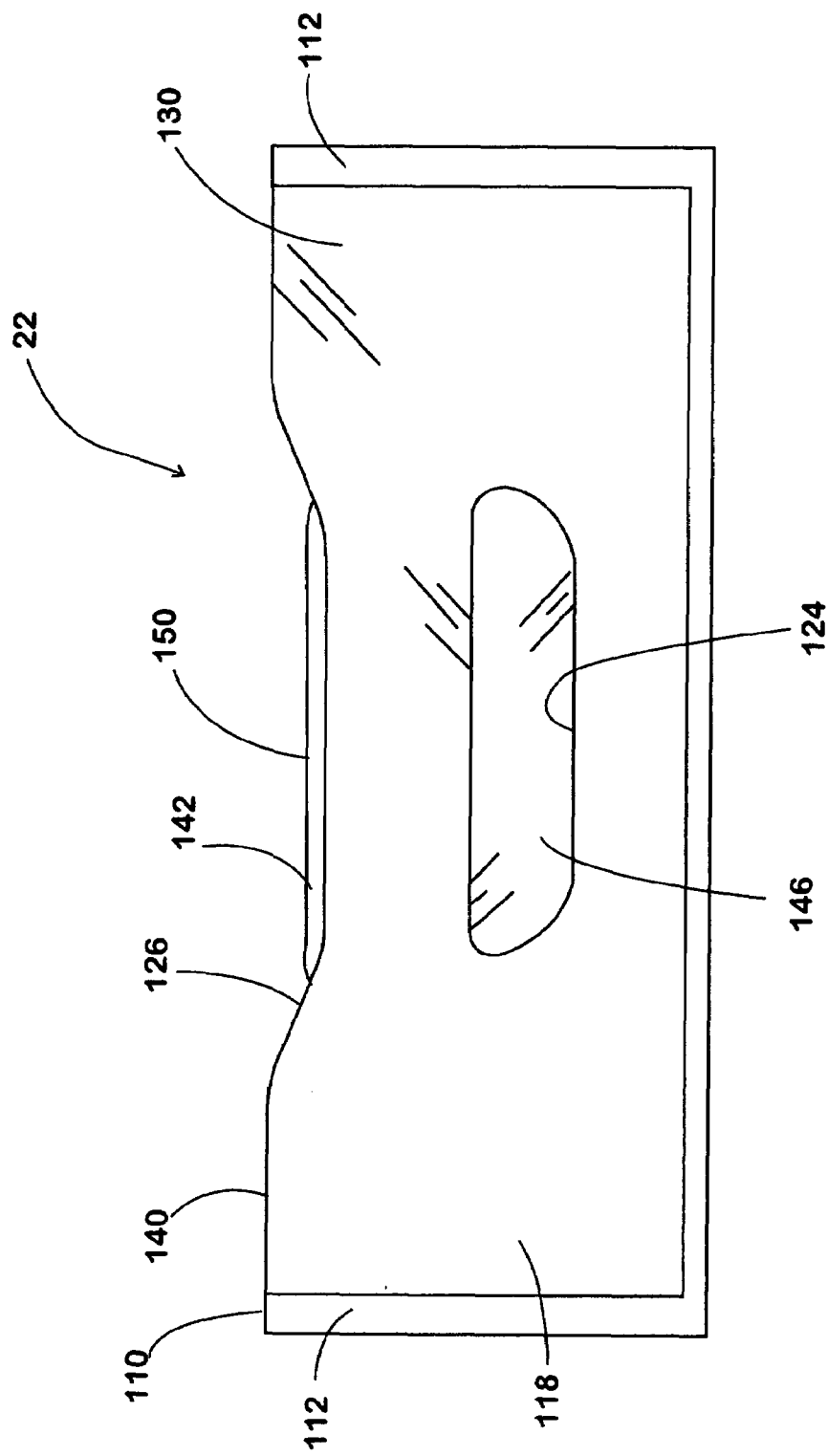
FIG. 7 is a schematic of the step assembly of FIG. 6 retracted.

Referring now to FIG. 3, the tailgate 18 is shown in the fully closed position, generally pivoted 180-degrees from the fully opened position and generally transverse to the cargo bed surface 14. In the fully closed position, the step assembly 22 retracts and closes off the opening 24 and the indented surface 26, as will be described in detail with respect to FIGS. 4 and 5. In the preferred embodiment, the drop-down step 42 slides in the pocket 34 to close off the indented surface 26, and a close-out member 46 slides in the pocket to close off the opening 24. As seen in FIG. 3, the close-out member 46 and the drop-down step 42 enclose the opening 24 and the indented surface 26, respectively, but they are inset from the inner and outer surfaces 36, 38 of the tailgate 18 since they are disposed in the pocket 34.

As seen in FIGS. 4 and 5, the inner panel 32 is removed to reveal the step assembly 22 preferably extending transversely from the plane of the outer panel 30. The step assembly 22 includes a stationary frame 48 and a moveable frame 50 that is configured to reciprocate with respect to the stationary frame. The stationary frame 48 is fixed with respect to the inner and outer panels 32, 30, and may be integrally formed with one of the panels or attached to the panels. The step assembly 22 is preferably made of aluminum or similar materials.

In the preferred embodiment, the stationary frame 48 includes two vertical members 52, 54 and two horizontal members 56, 58 extending generally transversely between the two vertical members. A capture formation 60 is formed by the two vertical members 52, 54 and the two horizontal members 56, 58 defining a generally rectangular structure. The capture formation 60 houses the close-out member 46, which is a part of the moveable frame 50. The height of the capture formation 60 is larger than the height of the close-out member 46 so that the close-out member can reciprocate back and forth in the capture formation 60. In this configuration, the capture formation 60 sets the limits of extension and retraction of the moveable frame 50 within the pocket 34 and with respect to the stationary frame 48.

The moveable frame 50 also includes the drop-down step 42, which is attached to and generally parallel to the close-out member 46. At least one link, but preferably two links 62 are spaced along the length of each of the drop-down step 42 and the close-out member 46. Preferably extending generally transversely from each of the close-out member 46 and drop-down step 42, the links 62 are preferably spaced a distance larger than the length of the opening 24 and the indented surface 26. With this arrangement, the links 62 do not protrude into the opening 24 or into the indented surface 26.

The horizontal member 56 of the stationary frame 48 includes at least one, but preferably two receiving formations, preferably grooves or apertures 64, for permitting the movement of the moveable frame 50 with respect to the stationary frame 48. In the preferred embodiment, the links 62 are slidingly received through the apertures 64 and permitted to reciprocate therein.

In FIG. 4, the tailgate 18 is pivoted generally 180-degrees, and the moveable frame 50 is extended. The close-out member 46 is translated downward in the capture formation 60 under the force of gravity. Preferably, a top surface 66 of the close-out member 46 is generally aligned with the bottom of the opening 24 to provide a stepping surface 44 with the inner and outer panels 32, 30. The horizontal member 56 prevents the further downward translation of the moveable frame 50, and the drop-down step 42 is extended.

In FIG. 5, the tailgate 18 is viewed from the cargo bed 10. The tailgate 18 is fully closed, and the moveable frame 50 is retracted under the force of gravity. The horizontal member 56 prevents the further downward translation of the moveable frame 50, and the drop-down step 42 is generally flush with the lower peripheral edge 40. Since gravity determines whether the step assembly 22 extends or retracts, the step assembly will retract if the tailgate 18 is pivoted from zero to 90-degrees, and the step assembly will extend if the tailgate is pivoted from 90 to 180-degrees.

To prevent unwanted extension of the step assembly 22 when the tailgate 18 is pivoted 90 to 180-degrees, a latch pin 68 can be provided to fix the moveable frame 50 with respect to the tailgate. It is contemplated that other mechanical locks can also be used to prevent the movement of the moveable frame 50.

An alternate embodiment of a step assembly is indicated generally at 122 in FIGS. 6-9. The embodiment of FIGS. 6-9 is generally similar to the embodiment of FIGS. 1-5, and similar features are similarly numbered in the 100-series. A tailgate 118 is pivotably disposed on a cargo bed 110 having bed sides 112 and a bed surface 114. The tailgate has an opening 124 generally centrally located, and a curved surface 126 at a lower peripheral edge 140 of the tailgate. The tailgate 118 has an inner and outer panel 132, 130, and a pocket 134 defined therebetween.

In the step assembly 122, a drop-down step 142 is generally "U"-shaped and protrudes from the lower peripheral edge 140 when the tailgate 118 is pivoted 90 to 180-degrees from the closed position. The horizontal portion of the "U"-shaped drop-down step 142 includes a stepping surface 144 for receiving a foot. When the tailgate 118 is pivoted zero to 90-degrees from the closed position, the drop-down step 142 retracts. Similar to the first embodiment, a close-out member 146 encloses the opening 124.

Figure 8:
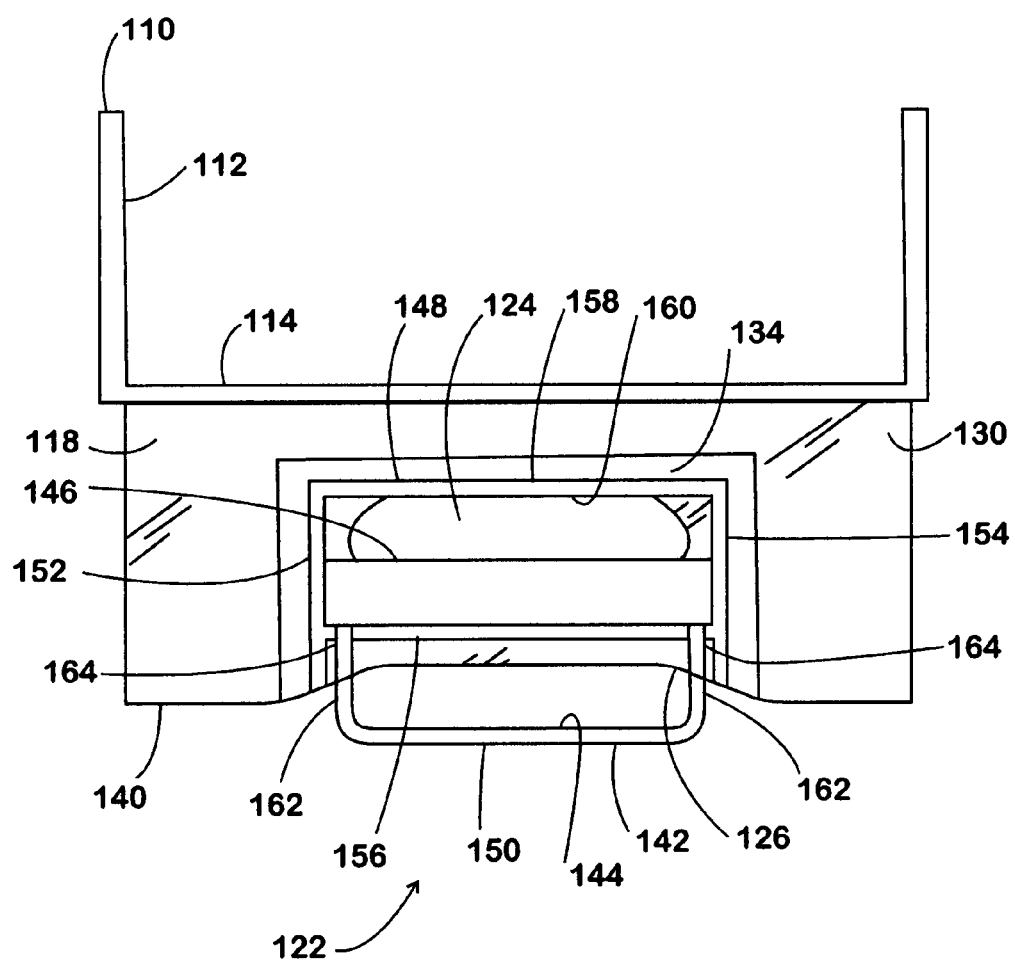
FIG. 8 is a schematic of the step assembly of FIG. 6, with an inner tailgate panel removed to reveal the step assembly extended.
Figure 9:
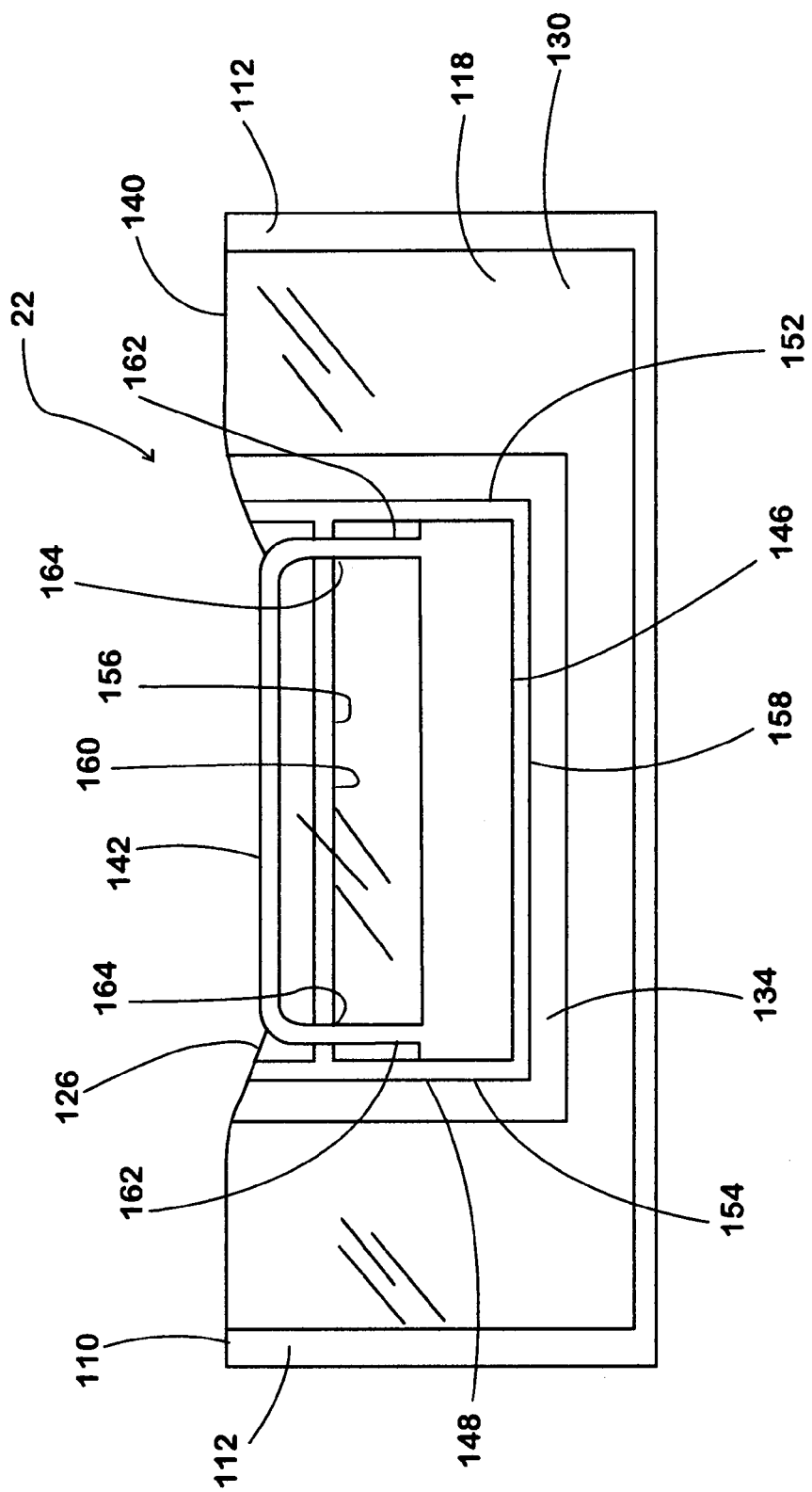
FIG. 9 is a schematic of the step assembly of FIG. 7, with the inner tailgate panel removed to reveal the step assembly retracted.

Referring now to FIGS. 8 and 9, the step assembly 122 includes a stationary frame 148 fixed to the tailgate 118 and a moveable frame 150 which is configured to translate with respect to the stationary frame. The stationary frame 148 has two horizontal members 156, 158 attached to two vertical members 152, 154 to form a capture formation 160. The moveable frame 150 includes the close-out member 146 which is housed in the capture formation 160. The close-out member 146 is sized and shaped to enclose the opening 124 in the tailgate 118 in the retracted position. Preferably, legs 162 of the "U"-shaped drop-down step 142 attach to the close-out member 146.

The horizontal member 156 of the stationary frame 148 includes at least one, but preferably two receiving formations, which are preferably grooves or apertures 164. The apertures 164 receive the legs 162 of the drop-down step 142 and permit the movement of the moveable frame 150 with respect to the stationary frame 148.

Various shapes and arrangements of capture formations 60, 160 that permit the predetermined extension and retraction of the moveable frame 50, 150 are contemplated. For example, the capture formation 60, 160 can be lugs or stop pins disposed on the tailgate 118 for impeding the motion of the moveable frame 50, 150. Further, a track system can be implemented as a capture formation 60, 160 to permit the predetermined amount of extension and retraction.

While the openings 24, 124, surfaces 26, 126, and the drop-down steps 42, 142 have been shown having particular shapes, sizes and arrangements, it is contemplated that other shapes, sizes and arrangements can be used. Further, the stepping surfaces of the openings can be provided with anti-skid materials to improve traction.

While particular embodiments of the present step assembly have been shown and described, it will be appreciated by those skilled in the art that changes and modifications may be made thereto without departing from the invention in its broader aspects and as set forth in the following claims.

We claim:

1. A tailgate hingeably connected to a vehicle and configured to pivot from a closed position to a generally vertical open position, the tailgate comprising:

an inner panel having an inner tailgate surface;

an outer panel having an outer tailgate surface, said outer panel attached to said inner panel to define a pocket therebetween;

an opening extending from said inner tailgate surface to said outer tailgate surface, said opening configured to receive a foot; and a step assembly housed in said pocket and moveable from a retracted position enclosing said opening, to an extended position revealing said opening, said step assembly comprising:

a stationary frame fixed with respect to said pocket; and a moveable frame moveable with respect to said stationary frame, wherein said moveable frame extends from a lower peripheral edge of the tailgate in said extended position.

2. The tailgate of claim 1 wherein said step assembly is retracted when the tailgate is pivoted zero to 90-degrees from said closed position, and said step assembly is extended when the tailgate is pivoted 90 to 180-degrees from said closed position.

3. The tailgate of claim 1 wherein said opening is an indented surface formed at said lower peripheral edge of the tailgate, and is of sufficient size and shape to accommodate a foot.

4. The tailgate of claim 3 further comprising a second opening extending from said inner tailgate surface to said outer tailgate surface, said second opening located above said lower peripheral edge, said second opening is of sufficient size and shape to accommodate a foot.

5. The tailgate of claim 1 wherein said moveable frame includes a drop-down step and a close-out member generally parallel to said drop down step, wherein said drop-down step and said close-out member are attached to each other with at least one link.

6. The tailgate of claim 5 wherein when said moveable frame is in the retracted position, said drop-down step encloses said opening.

7. The tailgate of claim 5 wherein said stationary frame includes a capture formation for housing said close-out member, wherein said capture formation permits the reciprocal movement of said close-out member within the confines of said capture formation.

8. The tailgate of claim 7 wherein said stationary frame further comprises a receiving formation configured to slidingly receive said at least one link of said moveable frame to permit the movement of said moveable frame with respect to said stationary frame.

9. The tailgate of claim 8 wherein said stationary frame further comprises a horizontal member generally parallel to said close-out member, wherein said receiving formation is disposed in said horizontal member, and said horizontal member confines said close-out member in said capture formation.

10. The tailgate of claim 1 further comprising a latch pin disposed on said lower peripheral edge and configured to fix the movement of said moveable frame with respect to the tailgate.

11. A tailgate hingeably connected to a vehicle and configured to pivot from a closed position to a generally vertical open position, the tailgate comprising:

a pocket defined within the tailgate and extending from a lower peripheral edge generally transverse to said lower peripheral edge and oriented between an inner tailgate surface and an outer tailgate surface;

an indented bottom surface located at said lower peripheral edge of the tailgate;

an opening extending from said inner tailgate surface to said outer tailgate surface, said opening extending generally transversely to said pocket; and a step assembly housed in said pocket and moveable from a retracted position enclosing said indented bottom surface and said opening, to an extended position revealing said indented bottom surface and said opening, said step assembly including a moveable frame moveable with respect to said pocket, wherein said moveable frame extends from said lower peripheral edge of the tailgate when in said extended position.

12. The tailgate of claim 1 wherein said step assembly is retracted when the tailgate is pivoted zero to 90-degrees from said closed position, and said step assembly is extended when the tailgate is pivoted 90 to 180-degrees from said closed position.

13. The tailgate of claim 11 wherein said step assembly further comprises a stationary frame disposed in and fixed with respect to said pocket, wherein said moveable frame is moveable with respect to said stationary frame.

14. The tailgate of claim 13 wherein said moveable frame includes a drop-down step and a close-out member generally parallel to said drop down step, wherein said drop-down step and said close-out member are attached to each other with at least one link.

15. The tailgate of claim 14 wherein said stationary frame includes a capture formation for housing said close-out member, wherein said capture formation permits the reciprocal movement of said close-out member within the confines of said capture formation.

16. The tailgate of claim 14 wherein said stationary frame further comprises a receiving formation configured to slidingly receive said at least one link of said moveable frame to permit the movement of said moveable frame with respect to said stationary frame.

17. The tailgate of claim 14 wherein when said step assembly is extended, said drop-down step extends below said lower peripheral edge to reveal said indented surface, and said close-out member extends below said opening to reveal said opening, and said indented surface and said opening are sized and shaped to accommodate a foot.

18. The tailgate of claim 14 wherein said drop-down step has a top surface, wherein when said step assembly is extended, said top surface is configured to be stepped on.

19. The tailgate of claim 14 wherein said drop-down step encloses said indented surface and said close-out member encloses said opening when the tailgate is pivoted zero to 90-degrees from said closed position.

20. A tailgate hingeably connected to a vehicle and configured to pivot from a closed position to a generally vertical open position, the tailgate comprising:
    an inner panel having an inner tailgate surface;
    an outer panel having an outer tailgate surface, said outer panel attached to said inner panel to define a pocket therebetween;
    an opening extending from said inner tailgate surface to said outer tailgate surface, said opening configured to receive a foot;
    an indented surface located at a lower peripheral edge; and
    a step assembly housed in said pocket and moveable from a retracted position enclosing said opening and said indented surface, to an extended position revealing said opening and said indented surface, said step assembly comprising:
        a stationary frame fixed with respect to said pocket; and
        a moveable frame moveable with respect to said stationary frame, wherein said moveable frame extends from said lower peripheral edge of the tailgate in said extended position.

* * * * *